United States Patent
Aoyama et al.

(10) Patent No.: US 7,221,403 B2
(45) Date of Patent: May 22, 2007

(54) IMAGE SIGNAL PROCESSING APPARATUS AND PROCESSING METHOD

(75) Inventors: Koji Aoyama, Saitama (JP); Kazuhiko Nishibori, Kanagawa (JP); Makoto Kondo, Kanagawa (JP); Takaya Hoshino, Saitama (JP)

(73) Assignee: Sony Corporation, Tokyo (JP)

( * ) Notice: Subject to any disclaimer, the term of this patent is extended or adjusted under 35 U.S.C. 154(b) by 518 days.

(21) Appl. No.: 10/498,432

(22) PCT Filed: Dec. 13, 2002

(86) PCT No.: PCT/JP02/13101

§ 371 (c)(1),
(2), (4) Date: Jun. 10, 2004

(87) PCT Pub. No.: WO03/056819

PCT Pub. Date: Jul. 10, 2003

(65) Prior Publication Data

US 2005/0012857 A1    Jan. 20, 2005

(30) Foreign Application Priority Data

Dec. 13, 2001  (JP)  .............................. 2001-380762

(51) Int. Cl.
*H04N 7/01* (2006.01)
(52) U.S. Cl. ...................... 348/452; 348/441; 348/459; 348/701; 348/910
(58) Field of Classification Search ................ 348/452, 348/441, 459, 701, 910, 443, 447, 448, 451, 348/699, 700, 911, 413.1, 416.1; 375/240.01, 375/240.26, 240.16; 382/236
See application file for complete search history.

(56) References Cited

U.S. PATENT DOCUMENTS

| | | | | |
|---|---|---|---|---|
| 5,398,071 A | * | 3/1995 | Gove et al. | 348/558 |
| 5,410,356 A | * | 4/1995 | Kikuchi et al. | 348/452 |
| 5,610,662 A | * | 3/1997 | Hackett | 348/452 |
| 5,978,424 A | | 11/1999 | Turner | |
| 6,072,531 A | * | 6/2000 | Shibano | 348/448 |
| 6,509,930 B1 | * | 1/2003 | Hirano et al. | 348/452 |
| 6,636,267 B1 | * | 10/2003 | Adachi | 348/448 |
| 6,704,463 B1 | * | 3/2004 | Okada et al. | 382/300 |

(Continued)

FOREIGN PATENT DOCUMENTS

| | | |
|---|---|---|
| EP | 0 514 012 | 11/1992 |
| EP | 1460847 A1 * | 9/2004 |
| JP | 61-26382 | 2/1986 |

(Continued)

*Primary Examiner*—David Ometz
*Assistant Examiner*—Jean W. Désir
(74) *Attorney, Agent, or Firm*—Frommer Lawrence & Haug LLP; William S. Frommer

(57) ABSTRACT

The present invention provides an image signal processing apparatus and a method thereof which perform double-speed conversion on images subjected to telecine conversion and in which a first field is specified based on difference values between pixel signal levels calculated with respect to respective detected pixels, write pixel positions which are shifted from the positions of the detected pixels in the vector directions of motion vectors are calculated in a field following the first field, the calculated write pixel positions are stored in correspondence with the motion vectors, interpolation pixel data is calculated from pixel data read from the first field in correspondence with the stored write pixel positions and motion vectors, and the calculated interpolation pixel data is written into the write pixel positions.

18 Claims, 12 Drawing Sheets

U.S. PATENT DOCUMENTS

| | | | |
|---|---|---|---|
| 6,876,367 B2 * | 4/2005 | Wada et al. | 345/690 |
| 6,885,705 B2 * | 4/2005 | Arita et al. | 375/240.16 |
| 6,947,094 B2 * | 9/2005 | Hoshino et al. | 348/441 |
| 6,990,148 B2 * | 1/2006 | Yang | 375/240.16 |
| 7,050,108 B2 * | 5/2006 | Nishibori et al. | 348/459 |
| 7,113,544 B2 * | 9/2006 | Tanase et al. | 375/240.16 |
| 7,133,453 B2 * | 11/2006 | Arita et al. | 375/240.16 |
| 2003/0227973 A1 * | 12/2003 | Nishibori et al. | 375/240.16 |
| 2005/0012856 A1 * | 1/2005 | Aoyama et al. | 348/459 |
| 2005/0264692 A1 * | 12/2005 | Hoshino et al. | 348/452 |

FOREIGN PATENT DOCUMENTS

| | | |
|---|---|---|
| JP | 3-165190 | 7/1991 |
| JP | 4-227180 | 8/1992 |
| JP | 5-137122 | 6/1993 |
| JP | 6-500910 | 1/1994 |
| JP | 8-84293 | 3/1996 |
| JP | 10-501953 | 2/1998 |
| JP | 11-196383 | 7/1999 |
| JP | 11-298861 | 10/1999 |
| JP | 2001-169252 | 6/2001 |

* cited by examiner

FIG. 12A INPUT SIGNAL

| NUMBER | 0 | 1 | 2 | 3 | 4 | 5 | 6 | 7 | 8 | 9 | 10 | 11 |
|---|---|---|---|---|---|---|---|---|---|---|---|---|
| IMAGE DATA D1 | 100 | 100 | 200 | 200 | 150 | 150 | 110 | 110 | 100 | 100 | 100 | 100 |
| IMAGE DATA D2 | 100 | 100 | 100 | 100 | 200 | 200 | 150 | 150 | 150 | 110 | 100 | 100 |
| MOTION VECTOR | 0 | 0 | 2 | 2 | 3 | 3 | 3 | 3 | 3 | 0 | 0 | 0 |
| FLAG F1 | 0 | 0 | 0 | 0 | 0 | 0 | 0 | 10 | 0 | 10 | 0 | 0 |

FIG. 12B VECTOR SHIFTER

| SHIFT BUFFER READ CONTROL SIGNAL RS1 | 0 | 1 | 2 | 3 | 4 | 5 | 6 | 7 | 8 | 9 | 10 | 11 |
|---|---|---|---|---|---|---|---|---|---|---|---|---|
| FLAG F' | NM | NM | NM | NM | NM | NM | NM | NM | NM | NM | NM | NM |

| SHIFT BUFFER WRITE CONTROL SIGNAL RS2 | 0 | 1 | 3 | 4 | 5 | 6 | 7 | 8 | 9 | 10 | 11 |
|---|---|---|---|---|---|---|---|---|---|---|---|
| MOTION VECTOR | 0 | 0 | 2 | 2 | 3 | 3 | 3 | 3 | 3 | 0 | 0 |

FIG. 12C DATA PROCESSOR

| NUMBER | 0 | 1 | 2 | 3 | 4 | 5 | 6 | 7 | 8 | 9 | 10 | 11 |
|---|---|---|---|---|---|---|---|---|---|---|---|---|
| MOVED MOTION VECTOR | 0 | 0 | 0 | 2 | 2 | 3 | 3 | 3 | 3 | 3 | 0 | 0 |
| PROCESSING FLAG F2 | OK | OK | NM | OK | OK | OK | OK | OK | OK | OK | OK | OK |

| BUFFER CONTROL SIGNAL S11 | 0 | 1 | 2 | 3 | 4 | 5 | 6 | 7 | 8 | 9 | 10 | 11 |
|---|---|---|---|---|---|---|---|---|---|---|---|---|
| SHIFT DATA SD1 | 100 | 100 | 200 | 200 | 150 | 110 | 110 | 110 | 100 | 100 | 100 | 100 |

| BUFFER CONTROL SIGNAL S12 | 0 | 1 | 2 | 4 | 5 | 7 | 8 | 9 | 10 | 11 |
|---|---|---|---|---|---|---|---|---|---|---|
| SHIFT DATA SD2 | 100 | 100 | 100 | 200 | 200 | 150 | 150 | 110 | 100 | 100 |

| NUMBER | 0 | 1 | 2 | 3 | 4 | 5 | 6 | 7 | 8 | 9 | 10 | 11 |
|---|---|---|---|---|---|---|---|---|---|---|---|---|
| CORRECTION DATA H1 | 100 | 100 | 100 | 200 | 200 | 150 | 150 | 110 | 105 | 100 | 100 | 100 |

IMAGE SIGNAL PROCESSING APPARATUS AND PROCESSING METHOD

TECHNICAL FIELD

The present invention relates to an image signal processing apparatus and a method thereof which shift the position of each detected pixel which are generated by performing double-speed conversion.

This application is based upon and claims the benefit of priority from the prior Japanese Patent Application No. 2001-380762 filed Dec. 13, 2001, the entire contents of which are incorporated herein by reference.

BACKGROUND ART

As a conventional scanning system used for TV broadcasting, an interlace scanning system which scans every other horizontal scanning lines has been widely used. In this interlace scanning system, every frame image is formed of a field image consisting of odd-numbered scanning lines and a field image consisting of even-numbered scanning lines, to suppress screen flicker disturbance which causes the entire screen to flicker, thus preventing deterioration of the screen quality.

The interlace scanning system has been adopted as a standard system for television in countries throughout the world. For example, according to PAL (Phase Alternation by Line) system in European television broadcasting, the field frequency is 50 Hz (frame images: 25 frame/second, field images: 50 fields/second).

In particular, the PAL system conventionally adopts a double-speed field frequency system in which the field frequency of inputted image signals is converted to be doubled from 50 Hz to 100 Hz, by performing an interpolation processing or the like, expecting further suppression of the screen flicker disturbance.

FIG. 1 is a block diagram showing a double-speed field conversion circuit 5 using the double-speed field frequency system. The double-speed field conversion circuit 5 is integrated in a television receiver 6 which has an input terminal 61, a horizontal/vertical deflection circuit 62, and a CRT 63. This double-speed field conversion circuit 5 has a double-speed converter 51, and a frame memory 52.

The double-speed converter 51 writes image signals of 50 fields/second according to the PAL system into the frame memory 52. Also, the double-speed field converter 51 reads the image signals written in the frame memory 52, at a speed twice higher than the writing speed. Thus, the frequency of the image signals of 50 fields/second is converted to a double frequency, so that image signals of 100 fields/second can be generated.

The double-speed converter 51 outputs the image signals subjected to the double conversion to the CRT 63. The CRT 63 displays the inputted image signals on the screen. Horizontal and vertical deflection of the image signals in the CRT 63 is controlled based on a horizontal/vertical saw tooth wave which is generated by the horizontal/vertical deflection circuit 62 and has a frequency which is twice that of the inputted image signals.

FIGS. 2A and 2B show a relationship between each field and pixel positions with respect to image signals before and after the double-speed conversion. In each figure, the abscissa axis represents time, and the ordinate axis represents the position of each pixel in the vertical direction. The image signals indicated by white circle marks in FIG. 2A are interlace image signals of 50 fields/second before the double-speed conversion, and the image signals indicated by black circle marks in FIG. 2B are interface image signals of 100 fields/second after the double-speed conversion.

In the image signals shown in FIG. 2A, fields $f_1$ and $f_2$ are signals generated from one single unit-frame of a film. Likewise, fields $f_3$ and $f_4$ constitute one single unit-frame. Since these image signals are interlace image signals, the pixel positions in the vertical direction differ between adjacent frames. Therefore, it is impossible to create a new field between every two adjacent fields, maintaining the characteristics of interlacing.

Hence, as shown in FIG. 2B, two fields $f_2'$ and $f_1'$ are newly generated between the fields $f_1$ and $f_2$. No new fields are not generated between the fields $f_2$ and $f_3$ but two new fields $f_4'$ and $f_3'$ are generated between the fields $f_3$ and $f_4$. That is, one unit-frame is formed of four fields forming two frames.

In some cases, those newly generated fields $f_1'$, $f_2'$, ... are obtained by using a median filter or the like, supposing that each pixel value is an intermediate value among three pixels surrounding each pixel. The newly generated fields $f_1'$, $f_2'$, ... have the same contents as the fields $f_1$, $f_2$, ..., respectively.

Specifically, the double-speed field conversion circuit 5 provides parts in each of which two new fields are generated and parts in each of which no new fields are generated, alternately among fields of image signals before the double-speed conversion. The number of screen images per unit time can thus be increased so that the screen flicker disturbance as previously described can be suppressed.

In order to watch a cinema film consisting of still images of 24 unit-frames/second on an ordinary TV set, television-to-cinema conversion (which will be hereinafter referred to as telecine conversion) is carried out to attain interlace television signals. FIGS. 3A and 3B show a relationship between each field and an image position in case where an image moves in the horizontal direction, with respect to the image signals after the telecine conversion. The abscissa axis represents the position of the image in the horizontal direction, and the ordinate axis represents time. In the image signals before the double-speed conversion shown in FIG. 3A, the fields $f_1$ and $f_2$ form one single unit-frame, so that the image is displayed at the same position. This image moves in the horizontal direction (to the right side) as the field shifts to the field $f_3$. Since the field $f_4$ forms part of the same unit-frame as the field $f_3$, the image is displayed at the same position as in the field $f_3$.

If image signals shown in FIG. 3A after the telecine conversion are subjected to the double-speed conversion according to the double-speed field frequency system, an equal image is displayed at an equal position in the fields $f_1$, $f_2'$, $f_1'$, and $f_2$ forming one single unit-frame, as shown in FIG. 3B. Similarly, an equal image is displayed at an equal position in the fields $f_3$, $f_4'$, $f_3'$, and $f_4$ forming one single unit-frame FIG. 4A shows relationships between respective fields and image positions in case where an image moves in the horizontal direction, in television signals (hereinafter referred to as TV signals) before the double-speed conversion. In FIG. 4A, the fields $f_1$, $f_2$, $f_3$, ... form independent unit-frames, respectively, so that the image is displayed at different positions. This image moves in the horizontal direction (right direction) as the field shifts from $f_1$ to $f_2$, $f_3$ ...

If the image signals of the television signals as shown in FIG. 4A are subjected to double-speed conversion according to the double-speed field frequency system, one equal image is displayed at one equal position in the fields $f_1$ and $f_2'$ which constitutes one equal unit-frame as shown in FIG. 4B. Similarly, one equal image is displayed at one equal position in the fields $f_1'$ and $f_2$ which constitutes one equal unit-frame.

However, as shown in FIG. 3B, after the telecine conversion, the image is displayed at one equal position from the field $f_1$ to the field $f_2$. When the field $f_2$ shifts to the field $f_3$, the image moves greatly in the horizontal direction. Similarly, in the image signals obtained by subjecting the TV signals to double-speed conversion, as shown in FIG. 4B, the image is displayed at one equal position from the field $f_1$ to the field $f_2'$. When the field $f_2'$ shifts to the fields $f_1'$, the image greatly moves in the horizontal direction.

Particularly, in the output image signals, each field is constructed regularly at a cycle of $\frac{1}{100}$ second. Therefore, the time band in which an image moves is shorter compared with the time band in which the image stands still. If a program is actually watched by a CRT, motions of images look discontinuous.

In variations of images in which, for example, pixel values vary while an image is moving in the horizontal direction, the discontinuity of images as described above needs to be eliminated. Particularly, it has been desired that the elimination of the discontinuity is realized by a structure in which the buffer volume is reduced.

DISCLOSURE OF THE INVENTION

An object of the present invention is to provide a novel image signal processing apparatus and a method thereof capable of solving problems involved by an image signal processing apparatus and a method thereof in which double-speed conversion is performed on images subjected to telecine conversion as described above.

Another object of the present invention is to provide an image signal processing apparatus and a method thereof capable of eliminating discontinuity in motions with a structure which can efficiently use buffers while suppressing screen flicker disturbance, with respect to image signals generated by performing double-speed conversion on images, particularly in a variety of images.

The present invention provides an image signal processing apparatus and a method thereof in which a first field is specified based on difference values between pixel signal levels calculated with respect to respective detected pixels, write pixel positions which are shifted from the positions of the detected pixels in the vector directions of motion vectors are calculated in a field following the first field, the calculated write pixel positions are stored in correspondence with the motion vectors, interpolation pixel data is calculated from pixel data read from the first field in correspondence with the stored write pixel positions and motion vectors, and the calculated interpolation pixel data is written into the write pixel positions.

More specifically, an image signal processing apparatus according to the present invention comprises: a sequence detector which calculates a difference value in signal level between a detected pixel in a current field and a detected pixel at the same position in a field which is one frame behind the current field, with respect to a double-speed converted image signal in which every unit-frame starts with a first field, and specifies the first field, based on the difference value; a motion vector detector which detects a motion vector for a field which is two frames behind the current frame, with respect to the detected pixel in the current field; a pixel position operator which calculates a write pixel position to which a position of the detected pixel in the current field is shifted by a shift amount in a vector direction of the motion vector, in a write field subsequent to the first field, with the shift amount gradually increased within a range of a vector quantity of the motion vector as the write field follows the first field; a storage which stores the write pixel position calculated for every write field, so as to correspond to the motion vector; a pixel data operator which reads pixel data from each of first fields before and after the write field, in correspondence with the write pixel position and the motion vector stored in the storage in correspondence with the write pixel position, and calculates interpolation pixel data, based on the read pixel data; and an image controller which writes the interpolation pixel data calculated by the pixel data operator into the write pixel position, in the write field.

Further, an image signal processing method according to the present invention comprises steps of: inputting a double-speed converted image signal in which every unit-frame starts with a first field; calculating a difference value in signal level between a detected pixel in a current field and a detected pixel at the same position in a field which is one frame behind the current field, with respect to the inputted image signal, and specifying the first field, based on the difference value; detecting a motion vector for a field which is one frame or two frames behind the current frame, with respect to the detected pixel in the current field; calculating a write pixel position to which a position of the detected pixel in the current field is shifted by a shift amount in a vector direction of the motion vector, in a write field subsequent to the first field, with the shift amount gradually increased within a range of a vector quantity of the motion vector as the write field follows the first field; storing the write pixel position calculated for every write field, so as to correspond to the motion vector; reading pixel data from each of first fields before and after the write field, in correspondence with the write pixel position and the motion vector stored in the storing step in correspondence with the write pixel position, and calculating interpolation pixel data, based on the read pixel data; and writing the interpolation pixel data calculated in the step of reading pixel data and calculating interpolation pixel data into the write pixel position, in the write field.

The above and other objects, advantages and features of the present invention will be more apparent from the following description of an embodiment taken in conjunction with the accompanying drawings.

BRIEF DESCRIPTION OF THE DRAWINGS

FIGS. 12A to 12C are tables showing a specific operation example of the image shifter with pixel value.

BEST MODE FOR CARRYING OUT THE INVENTION

An image signal processing apparatus and a method thereof to which the present invention is applied will now be described in details with reference to the drawings.

An embodiment of the present invention will now be described in details with reference to the drawings.

The present invention is applied to an image signal processing apparatus built in a television receiver according to PAL (Phase Alternation by Line) system.

Figure 1:
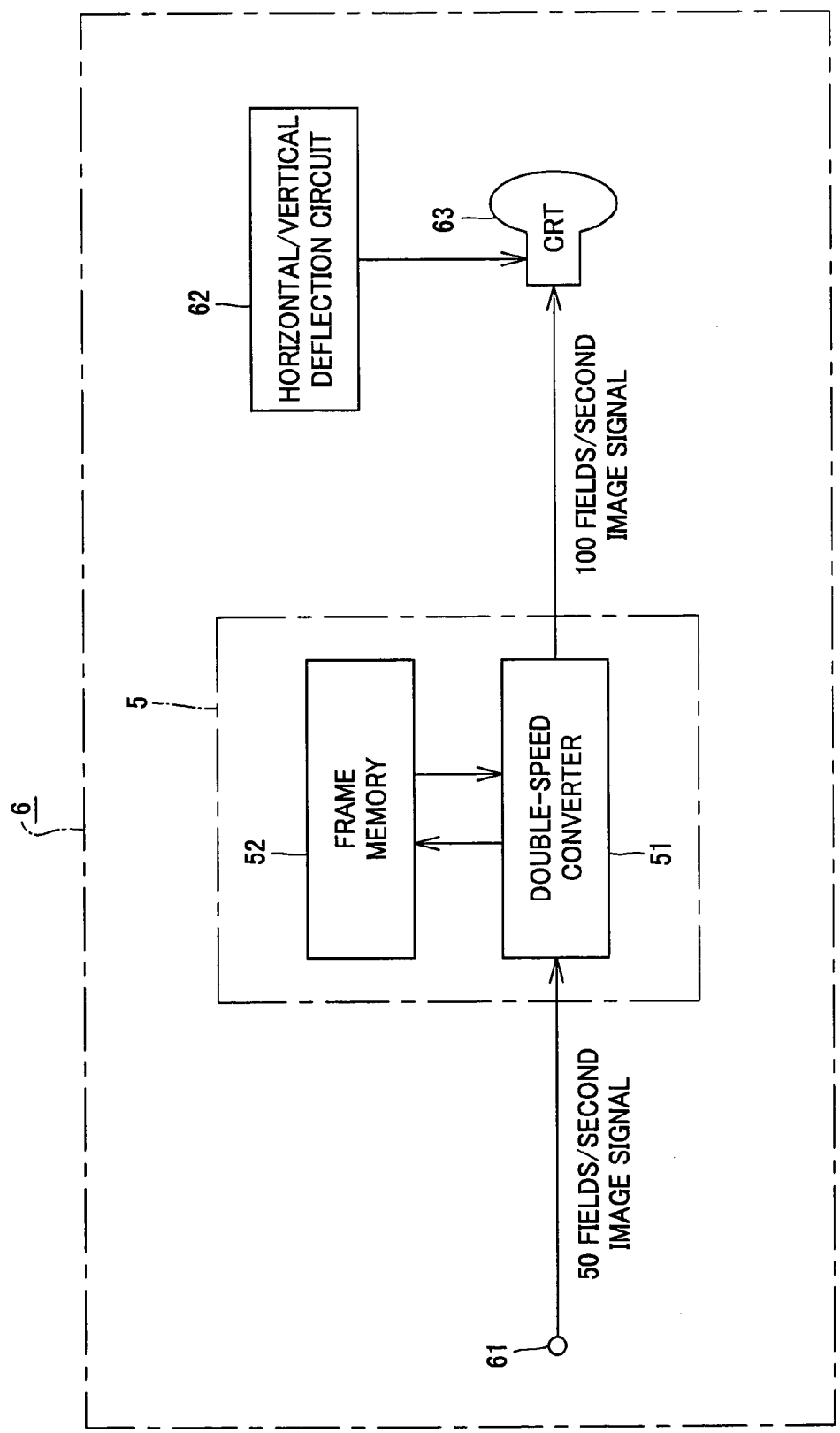
FIG. 1 is a block diagram showing a double-speed field conversion circuit to which a double-speed field frequency system is applied.
Figure 2B:
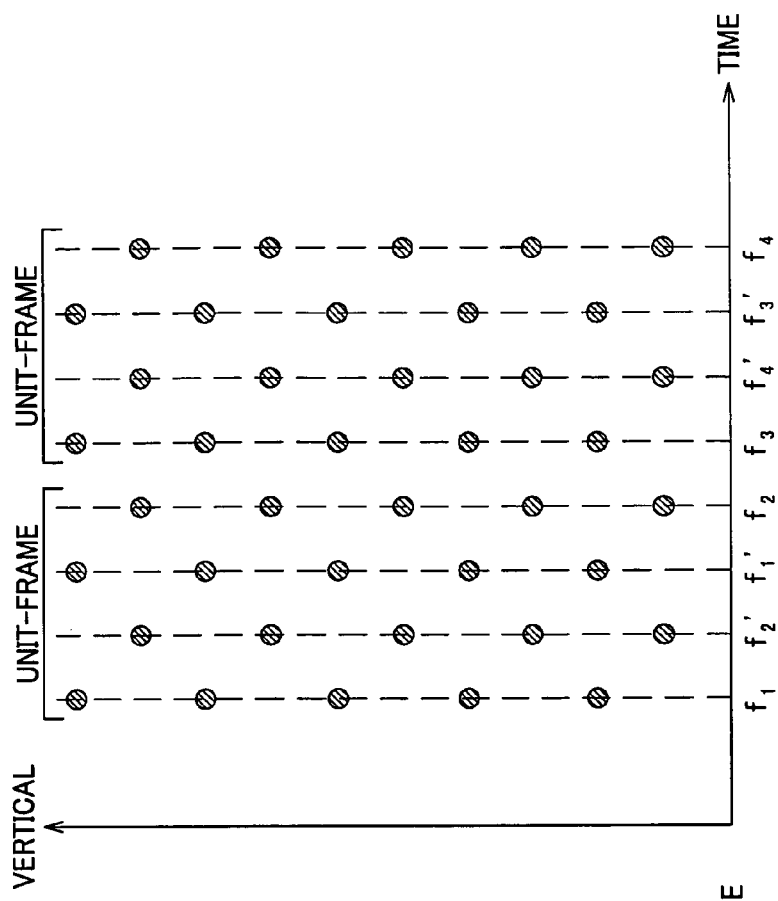
FIGS. 2A and 2B show a relationship between each of fields before and after the double-speed conversion and pixel positions.
Figure 2A:
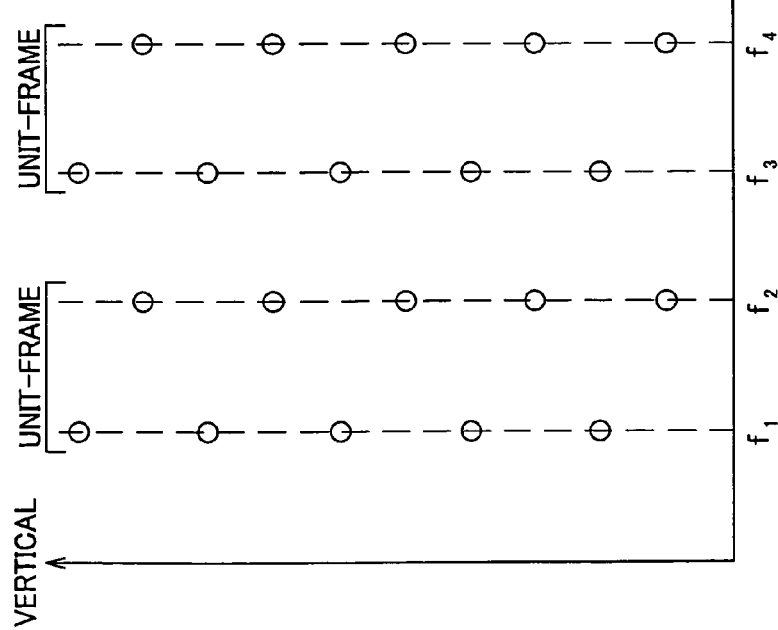
Figure 3B:
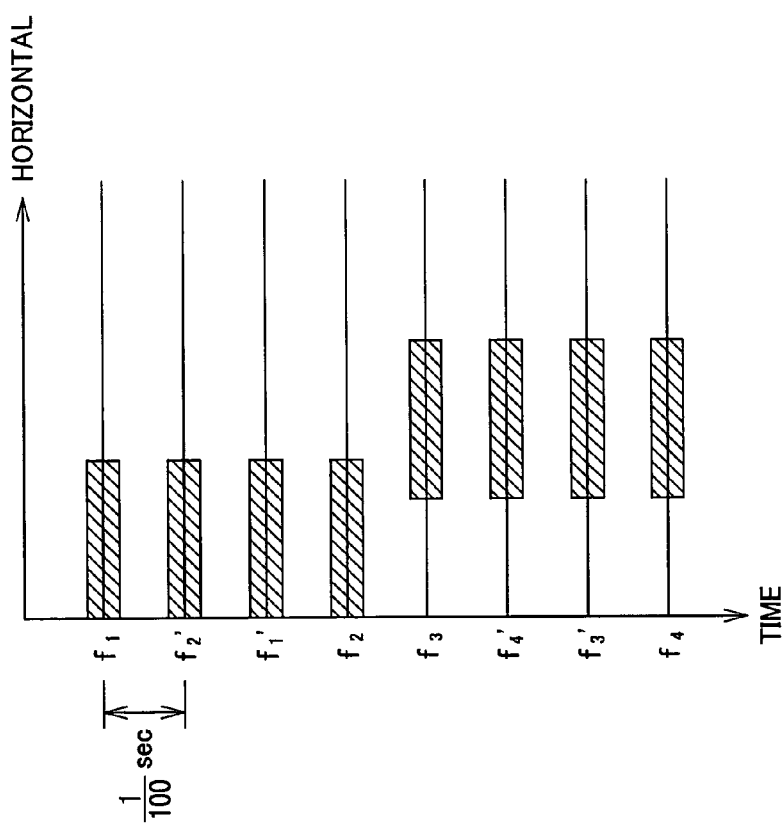
FIGS. 3A and 3B show a relationship between each field and an image position in case where an image moves in the horizontal direction.
Figure 3A:
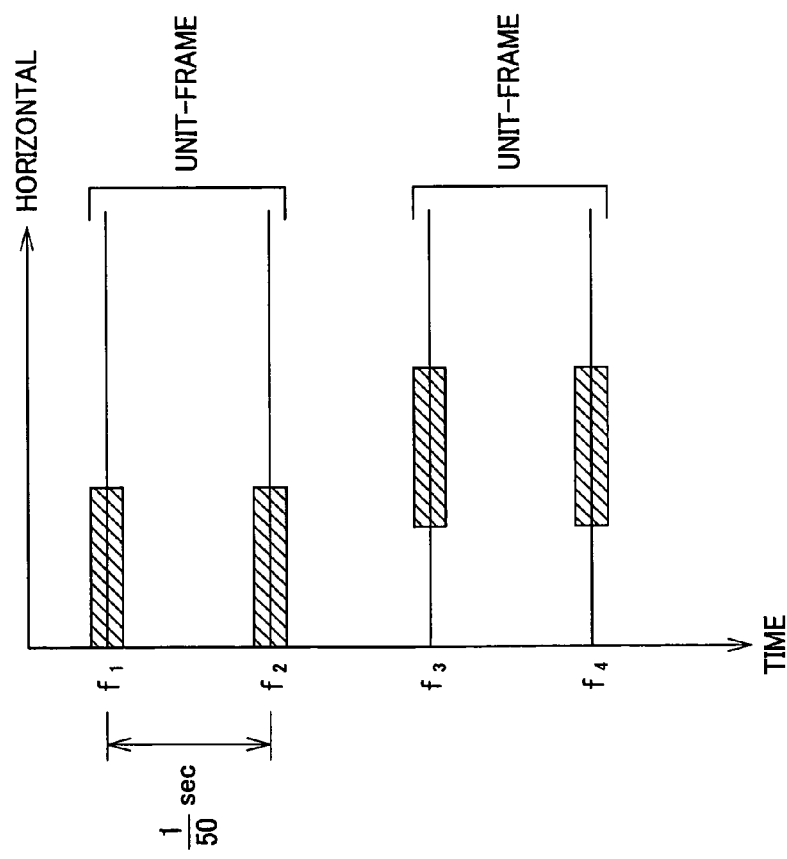
Figure 4B:
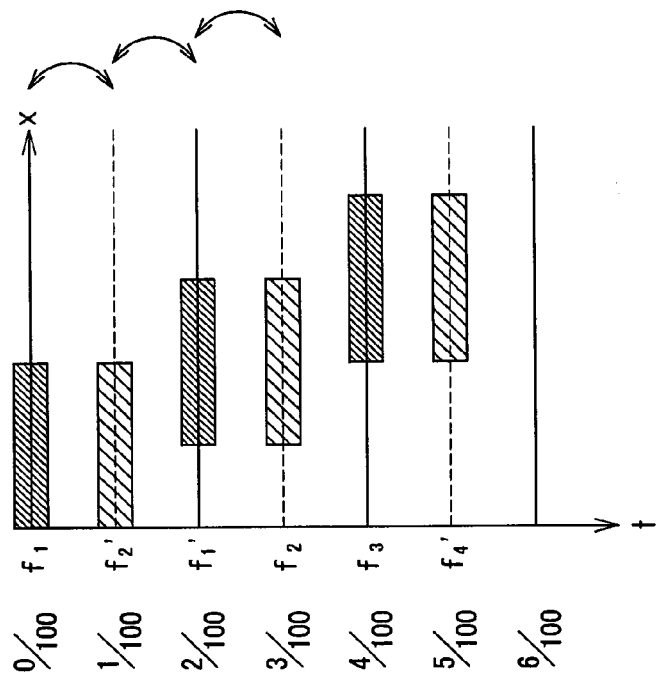
FIGS. 4A and 4B show a relationship between each field and an image position when an image moves in the horizontal direction in case where TV signals are inputted.
Figure 4A:
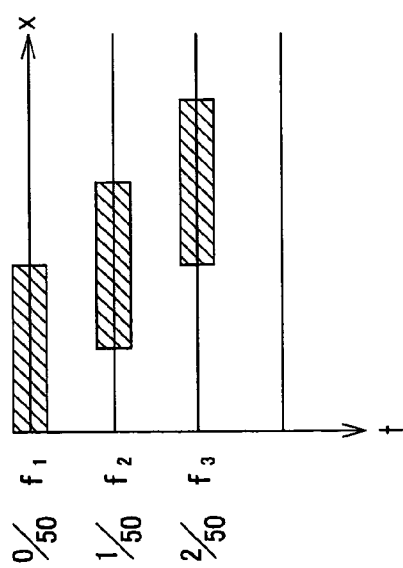
Figure 5:
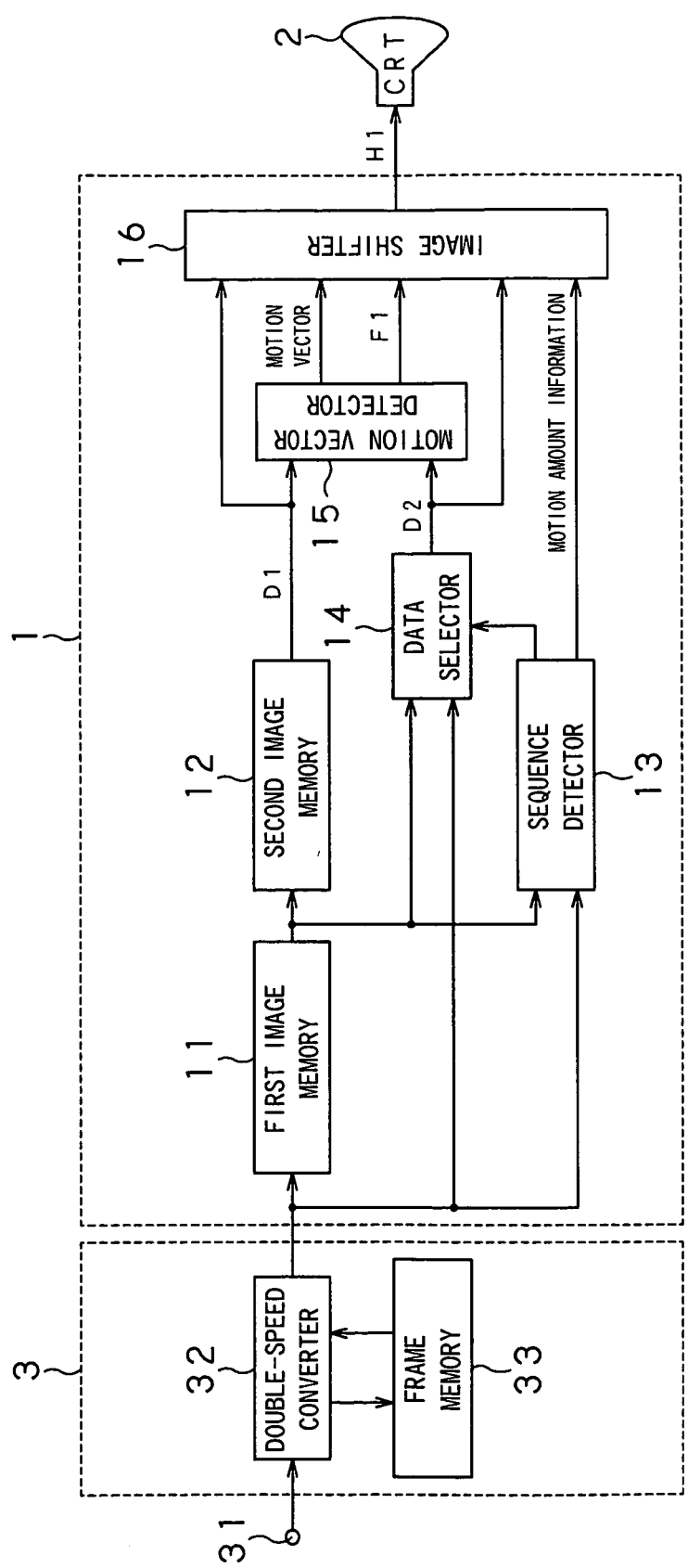
FIG. 5 is a block circuit diagram showing an image signal processing apparatus to which the present invention is applied.

An image signal processing apparatus 1 to which the present invention is applied has a structure as shown in FIG. 5.

The image signal processing apparatus 1 has a first image memory 11, a second image memory 12, a sequence detector 13, a motion vector detector 15, and an image shifter 16, as shown in FIG. 5.

The first image memory 11 is sequentially supplied with interlace image signals of, for example, 100 fields/second which are generated by performing double-speed conversion on images subjected to telecine conversion and have a unit-frame formed of 4 fields. The first image memory 11 is sequentially supplied with interlace image signals of, for example, 100 fields/second which are generated by performing double-speed conversion on TV signals and have a unit-frame formed of 2 fields.

The first image memory 11 stores the supplied image signals for every one frame, in units of fields. That is, image data is outputted from the first image memory 11 after one frame after the image signals were supplied to the first image memory 11.

The second image memory 12 has the same internal structure as the first image memory 11 and stores the image signals supplied from the first image memory 11 for every one frame, in units of fields. That is, image data is outputted from the second image memory 12 after one frame after the image data was supplied to the second image memory 12, i.e., after two frames after the image data was supplied to the first image memory 11. The image data D1 stored in the second image memory 12 is supplied to the motion vector detector 15 and the image shifter 16.

The sequence detector 13 detects the image data supplied to the first image memory 11 and the image data outputted from the first image memory 11, and compares image signal levels for every pixel, to calculate a difference value between the supplied and outputted data. That is, the sequence detector 13 compares the image signal levels for each pixel at one single part of a screen, at cycles of frames. The sequence detector 13 transmits the calculation result concerning the difference value to the image shifter 16. In addition to the specification of each field, as described above, the sequence detector 13 determines either telecine-converted signals or TV signals and transmits the determination result as motion amount information to a data selector 14 and the image shifter 16.

The data selector 14 is inputted with the image data supplied to the first image memory 11 and the image data outputted from the first image memory 11. The data selector 14 selects one from the supplied image data, based on the determination result received from the sequence detector 13. That is, if the sequence detector 13 determines the telecine-converted signals, the image data supplied to the first image memory 11 is selected. Otherwise, if the sequence detector 13 determines the TV signals, the image data outputted from the first image memory 11 is selected. The image data selected by the data selector 14 will be hereinafter referred to as image data D2. The data selector 14 ouptuts the selected image data D2 to the motion vector detector 15.

The present embodiment is also applicable to a form of connection in which either the image data outputted from the first image memory 11 or the image data outputted from the second image memory 12 is selected.

The motion vector detector 15 detects the image data D1 and the image data D2, and motion vectors, for example, based on a block matching method. In the block matching method, the screen is divided into blocks each consisting of predetermined pixels, and motion vectors are obtained by evaluating similarity in units of blocks. The image data D1 outputted from the second image memory 12 is a two-frame-delayed field of the reference field. The image data D2 outputted from the data selector 14 is exactly the reference field itself, or a one-frame-delayed field of the reference field.

Specifically, the motion vector detector 15 can detect a motion vector between the reference field and the two-frame-delayed signals by detecting a motion vector between the image data D1 and the image data D2, as well as can detect a motion vector between the one-field-delayed signals of the reference field and the two-frame-delayed signals of the reference field. In other words, the field interval at which every motion vector is detected can be controlled based on a determination result received from the sequence detector 13.

The motion vector detector 15 calculates a flag F1 including error information of the detected motion vector, based on the supplied image data D1 and D2. For example, an absolute sum of differences is obtained when evaluating similarity between blocks in the block matching method described above. An error value of the detected motion vector is calculated, based on the absolute sum of differences which is obtained by this calculation process or based on the absolute value of the difference of every pixel, and the error value is taken as the flag F1.

The motion vector detector 15 transmits the detected motion vector and the flag F1 to the image shifter 16.

The image shifter 16 receives the motion amount information including a result of comparing image signal levels, from the sequence detector 13. The image shifter 16 receives the motion vector detected by the motion vector detector 15 and the flag F1. Further, the image shifter 16 is supplied with the image data D1 from the second image memory 12 as well as the image data D2 from the data selector 14. The image shifter 16 shifts each pixel positions of the supplied image signals, within the range of the vector quantity of the received motion vector, in the vector direction. An example of the internal configuration of the image shifter 16 will be described in details later.

In some cases, a double-speed field conversion circuit 3 which performs double-speed conversion on the field frequency of image signals may be integrated in the image signal processing apparatus 1. The double-speed field conversion circuit 3 is integrated to prevent screen flicker disturbance by improving the resolution. For example, a processing such as interpolation is performed in the PAL system, to convert image data having a field frequency of 50 Hz into image data having a double frequency of 100 Hz.

The double-speed field conversion circuit 3 has an input terminal 31 connected to a television receiver, a double-speed converter 32, and a frame memory 33, as shown in FIG. 5.

The double-speed converter 32 writes image data after the telecine conversion, which is inputted through the input terminal 31 from the television receiver, or television signals, into the frame memory 33. The double-speed converter 32 reads the image data written into the frame memory 33, at a speed which is twice the writing speed. As a result, for example, the frequency of the image signals of 50 fields/second according to the PAL system is converted to a double frequency, so that image signals of 100 fields/second can be generated. The double-speed converter 32 supplies the image signal processing apparatus 1 with the image signals subjected to the double-speed conversion.

Figure 6:
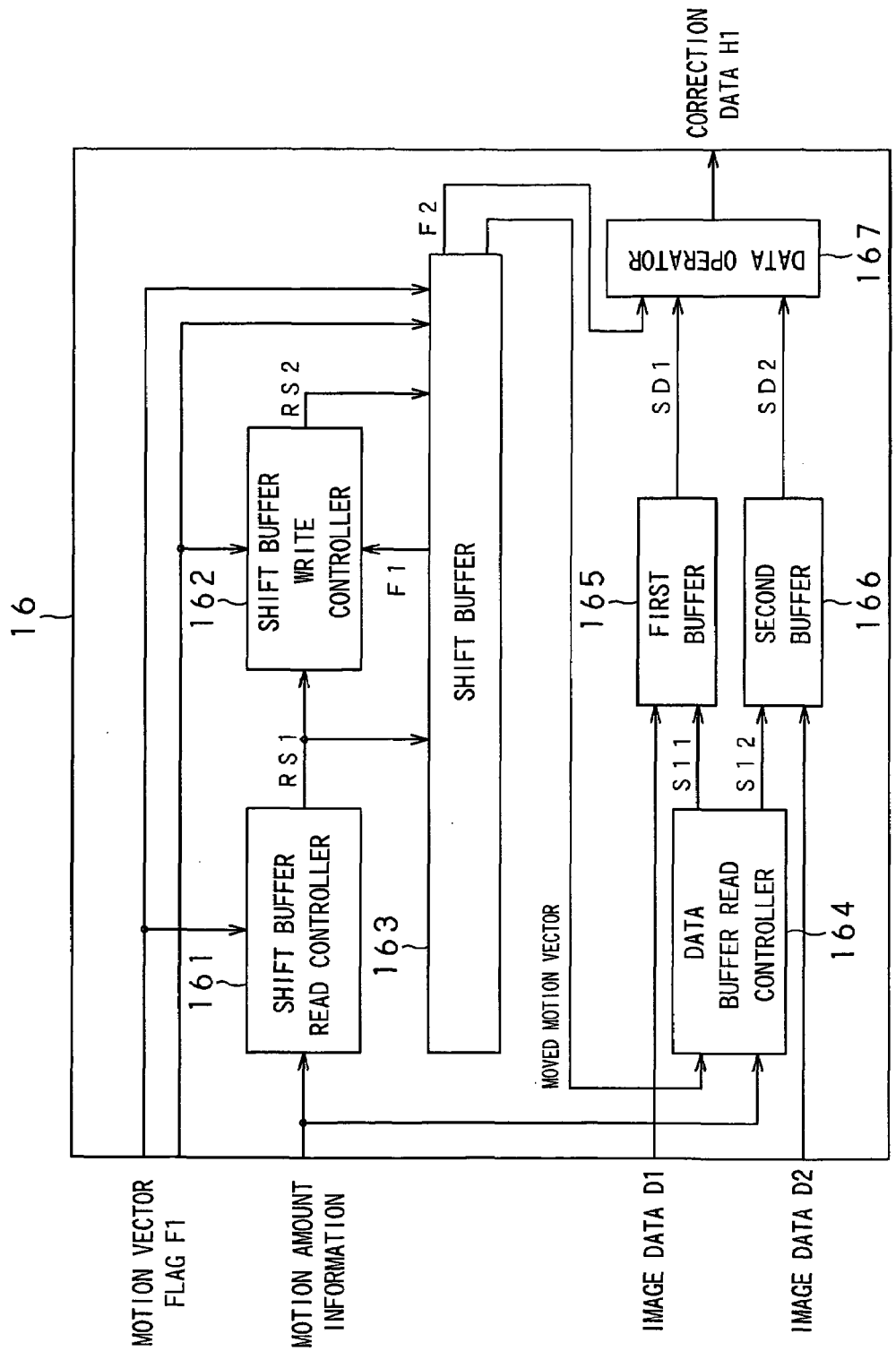
FIG. 6 is a block circuit diagram showing an image shifter forming part of the image signal processing apparatus according to the present invention.

Next, a detailed example of the internal structure of the image shifter 16 will be described with reference to FIG. 6. The image shifter 16 has a shift buffer read controller 161, a shift buffer write controller 162, a shift buffer 163, a data buffer read controller 164, a first buffer 165, a second buffer 166, and a data operator 167.

A motion vector is transmitted to the shift buffer read controller 161 from the motion vector detector 15, and motion amount information is transmitted from the sequence detector 13. The shift buffer read controller 161 generates a shift buffer read control signal RS1, based on the motion vector, the motion amount information and an internal counter for address calculation. The shift buffer read control signal RS1 is constituted by an address signal for sequentially reading out data, and an enable signal. For example, in case where the shift buffer 163 is realized by a frame memory or the like, the shift buffer read controller 161 calculates address signals of X- and Y-coordinates, respectively, as absolute coordinates. On the other side, in case where the shift buffer 163 is realized by a least necessary memory such as a line memory or the like, the shift buffer read controller 161 calculates address signals of X- and Y-coordinates, respectively, as absolute coordinates.

When X- and Y-coordinates of the values of the internal address calculation counter are (CX1, CY1) and X- and Y-coordinates of the supplied motion vector are (VX, VY), the address (SX, SY) of the shift buffer read control signal RS1 is expressed by the following expressions.

$$SX = CX1 + (VX \times \alpha) \quad (1.1)$$

$$SY = CY1 + (VY \times \alpha) \quad (1.2)$$

In these expressions, α is motion amount information and is expressed as a number which is equal to or greater than 0 and is equal to or smaller than 1. The α is minimized in the first field, and sequentially increases every time a later field follows. If telecine-converted signals are inputted, α can be increased linearly, e.g., 0, ¼, 2/4, ¾, . . . Likewise, if TV signals are *inputted*, α can be linearly *increased*, e.g., 0, ½, . . . .

The shift buffer read controller 161 supplies the shift buffer write controller 162 and the shift buffer 163 with a generated buffer read control signal RS1.

The shift buffer write controller 162 is supplied with a flag F1 from the motion vector detector 15, a flag F' from the shift buffer 163 as well as the shift buffer read control signal RS1 from the shift buffer read controller 161. The shift buffer write controller 162 determines the priority order in writing, based on the magnifications of the flags F and F'. Further, the shift buffer write controller 162 obtains a write address, based on the supplied shift buffer read control signal RS1, and supplies the write address and the priority order determined as described above, as a shift buffer write control signal RS2, to the shift buffer 163.

The shift buffer 163 is constituted by a motion vector buffer and a flag buffer. The motion vector buffer serves to store and supply motion vectors. The flag buffer serves to store and supply flags. These buffers perform reading and writing, based on the same control signals. Note that the shift buffer 163 needs only to store motion vectors and flags, so the buffer capacitance is expected to decrease.

The shift buffer 163 may be a frame memory which stores data of one frame or may be constituted by a least necessary memory such as a line memory corresponding to a possible range which the motion vector can take.

The shift buffer 163 initializes the flag buffer at first. The flag written into the flag buffer includes mark information indicative of whether data has been written or not. The mark information is expressed by two types of "NM" and "OK". "NM" indicates that data has not been written at the time of initialization, and "OK" indicates that data has already been written. If "enable" of the shift buffer read control signal RS1 is valid, the shift buffer 163 transmits a flag F' to the shift buffer write controller 162 with the address made correspond. If "enable" of the shift buffer write control signal RS2 is valid, the shift buffer 163 writes the motion vector and the flag F1 to the vector buffer and the flag buffer, respectively, in accordance with the address value. Further, the shift buffer 163 arranges stored motion vectors in the numbered order (where the motion vectors arranged in the numbered order will be hereinafter referred to as moved motion vectors), and reads processing flags F2 sequentially. Then, the shift buffer 163 supplies the processing flags F2 respectively to the data buffer controller 164 and data operator 167.

The data buffer read controller 164 is supplied with the moved motion vectors from the shift buffer 163. The motion amount information is transmitted from the sequence detector 13 to the data buffer read controller 164. The data buffer read controller 164 operates the buffer control signal S11 and the buffer control signal S12, based on an inputted motion vector. The buffer control signals S11 and S12 each are constituted by an address signal for reading sequentially data, and an enable signal. For example, if the first buffer 165 and the second buffer 166 are realized by frame memories and the like, the data buffer read controller 164 calculates the address signals of X- and Y-coordinates respectively as absolute coordinates. Alternatively, if the first buffer 165 and the second buffer 166 are realized by least necessary memories such as line memories and the like, the data buffer read controller 164 calculates address signals of the X- and Y-coordinates respectively as absolute coordinates.

The data buffer read controller 164 generates a buffer control signal S11, based on the value of the internal address calculation counter and a motion vector. Also, the data buffer read controller 164 generates a buffer control signal S12, based on the buffer control signal S11 and a motion vector.

Suppose that, for example, X- and Y-coordinates are (AX1, AY1) at the address of the buffer control signal S11, X- and Y-coordinates are (AX2, AY2) at the address of the buffer control signal S12 motion vectors are (VX, VY), and values of the internal address calculation counter are (CX', CY'), if TV signals are inputted. Then, the address of the buffer control signal S11 is expressed by the following expressions.

$$AX1=CX'-INT(VX/2) \quad (2.1)$$

$$AY1=CY'-INT(VY/2) \quad (2.2)$$

In these expressions, the function INT means round-down of places after the decimal point.

The address (AX2, AY2) of the buffer control signal S12 is expressed by the following expressions.

$$AX2=AX1+VX \quad (2.3)$$

$$AY2=AY1+VY \quad (2.4)$$

The data buffer read controller 164 supplies the buffer control signal S11 including the calculated address, to the first buffer 165. Also, the data buffer read controller 164 supplies the second buffer 166 with the buffer control signal S12 including the calculated address.

The first buffer 165 sequentially stores the image data D1 transmitted from the second image memory 12. The first buffer 165 reads the stored image data D1 in accordance with the supplied buffer control signal S11. That is, when the "enable" of the supplied buffer control signal S11 is valid, the first buffer 165 reads the image data D1 stored in the first buffer 165, in accordance with the address included in the buffer control signal S11. The read image data D1 will be hereinafter referred to as shift data SD1. The first buffer 165 transmits the shift data SD1 to the data operator 167.

The first buffer 165 may be a frame memory which stores data of one frame or may be constituted by a least necessary memory such as a line memory based on the range of the motion vector. Further, the first buffer sequentially reads data, and can therefore be realized by a FIFO memory and the like.

The second buffer 166 sequentially stores the image data D2 transmitted from the data selector 14. The second buffer 166 reads the stored image data D2, in correspondence with the supplied buffer control signal S12. That is, when the "enable" of the supplied buffer control signal S12 is valid, the second buffer 166 reads the image data D2 stored in the second buffer 166, in accordance with the address included in the buffer control signal S12. The read image data D2 will be hereinafter referred to as shift data SD2. The second buffer 166 transmits the shift data SD2 to the data operator 167.

The second buffer 166 may be a frame memory which stores data of one frame or may be constituted by a least necessary memory such as a line memory based on the range of the motion vector. In this case, a constructed system will read data at random in correspondence with addresses given at random.

The data operator 167 calculates correction data H1, referring to the processing flag F2 supplied from the shift buffer 163, based on the supplied shift data SD1 and SD2. The data operator 167 sequentially outputs operated correction data H1 to a CRT 2.

The correction data H1 may perform the operation by outputting directly the shift data SD1 and SD2 or by taking average values between the shift data SD1 and SD2. Further, motion data M1 may be calculated in form of taking an average weight with use of values of motion vectors.

Next, the operation of the image signal processing apparatus 1 according to the present invention will be described.

Figure 7:
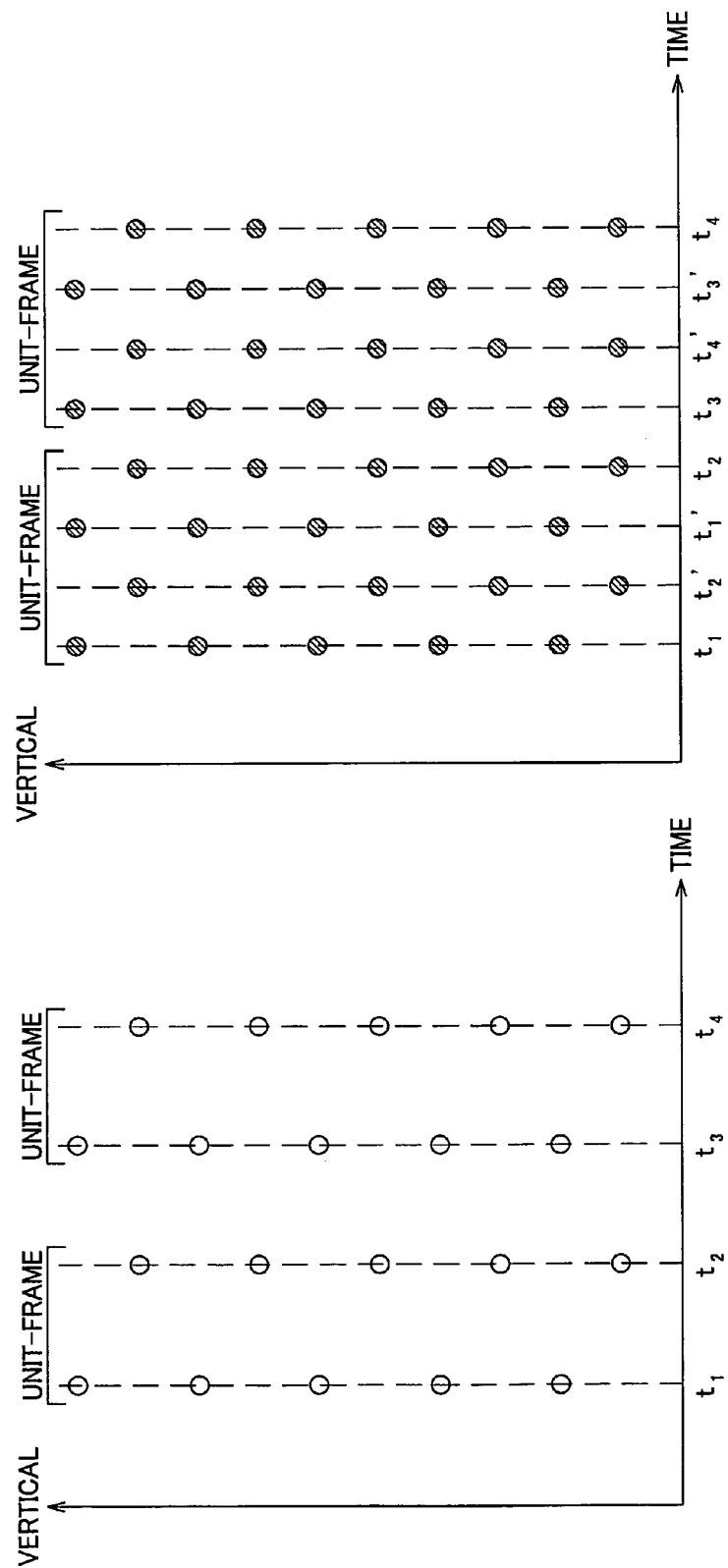
FIGS. 7A and 7B show a relationship between each of fields before and after double-speed conversion in a double-speed field conversion circuit and pixel positions.

FIGS. 7A and 7B show a relationship between each field and pixel positions before and after the double-speed conversion in the double-speed field conversion circuit 3. In the figures, the abscissa axis represents time and the ordinate axis represents the position of each pixel in the vertical direction.

The image data before the double-speed conversion is of interlace image signals of 50 fields/second according to the PAL system, and every unit-frame is formed of two fields, as shown in FIG. 7A.

On the other side, the image data after the double-speed conversion is of interlace image signals of 100 fields/second. Therefore, as shown in FIG. 7B, new two fields $t_2'$ and $t_1'$ are generated between fields $t_1$ and $t_2$. No fields are generated between fields $t_2$ and $t_3$ but further new two fields $t_4'$ and $t_3'$ are generated between fields $t_3$ and $t_4$. Thus, in the image data, every unit-frame is formed of four fields.

In some cases, those newly generated fields $t_1'$, $t_2'$, . . . are obtained by using a median filter or the like, supposing that each pixel value is an intermediate value among three pixels surrounding each pixel. The newly generated fields $t_1'$, $t_2'$, . . . have the same contents as the fields $t_1$, $t_2$, . . . , respectively. As a result of this, every unit-frame is formed of four fields, so that the resolution can be improved by increasing the number of screens per unit time. Accordingly, the screen flicker disturbance can be suppressed.

Figure 8:
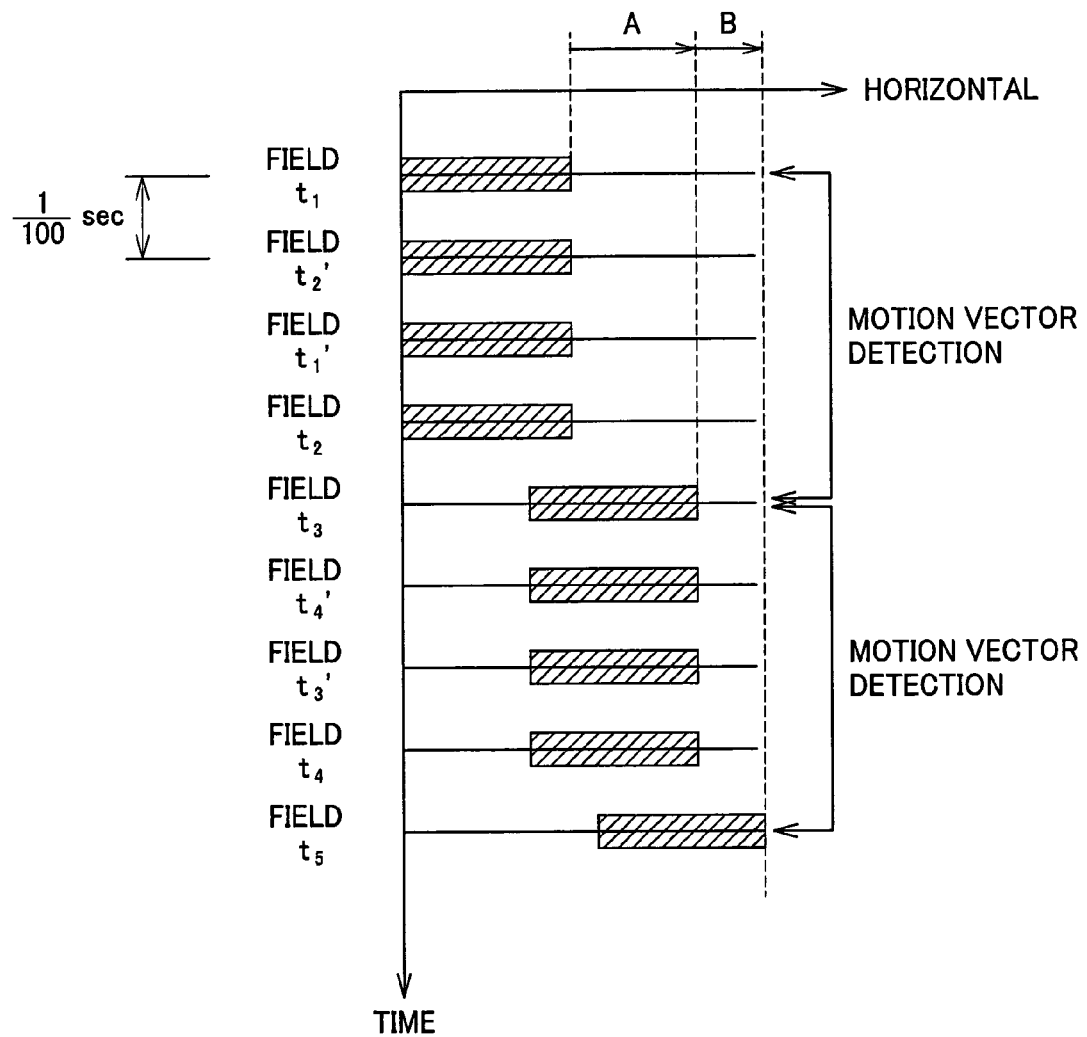
FIG. 8 shows a relationship between each field and an image position in case where an image moves in the horizontal direction in a telecine-converted image.

FIG. 8 shows a relationship between each field and the image position in case where an image moves in the horizontal direction in the image data subjected to double-speed conversion as described above after telecine-conversion. In FIG. 8, the abscissa axis represents the position in the horizontal direction of the image, and the ordinate axis represents time. Images which have already been telecine-converted are supplied to the first image memory 11 at a constant time interval, as shown in FIG. 8, in the order of fields $t_1$, $t_2'$, $t_1'$, and $t_2$. These images are displayed on one equal position. As the field shifts to $t_3$, the image shifts in the horizontal direction (right direction), and the images are supplied to the first image memory in the order of fields $t_3$, $t_4'$, $t_3'$, and $t_4$.

In this case, for example, if the field supplied to the first image memory is the field $t_3$, the field (hereinafter referred to as a two-frame-delayed field) which is outputted from the second image memory 12 and is two frames ahead the reference field is the field $t_1$.

Figure 9:
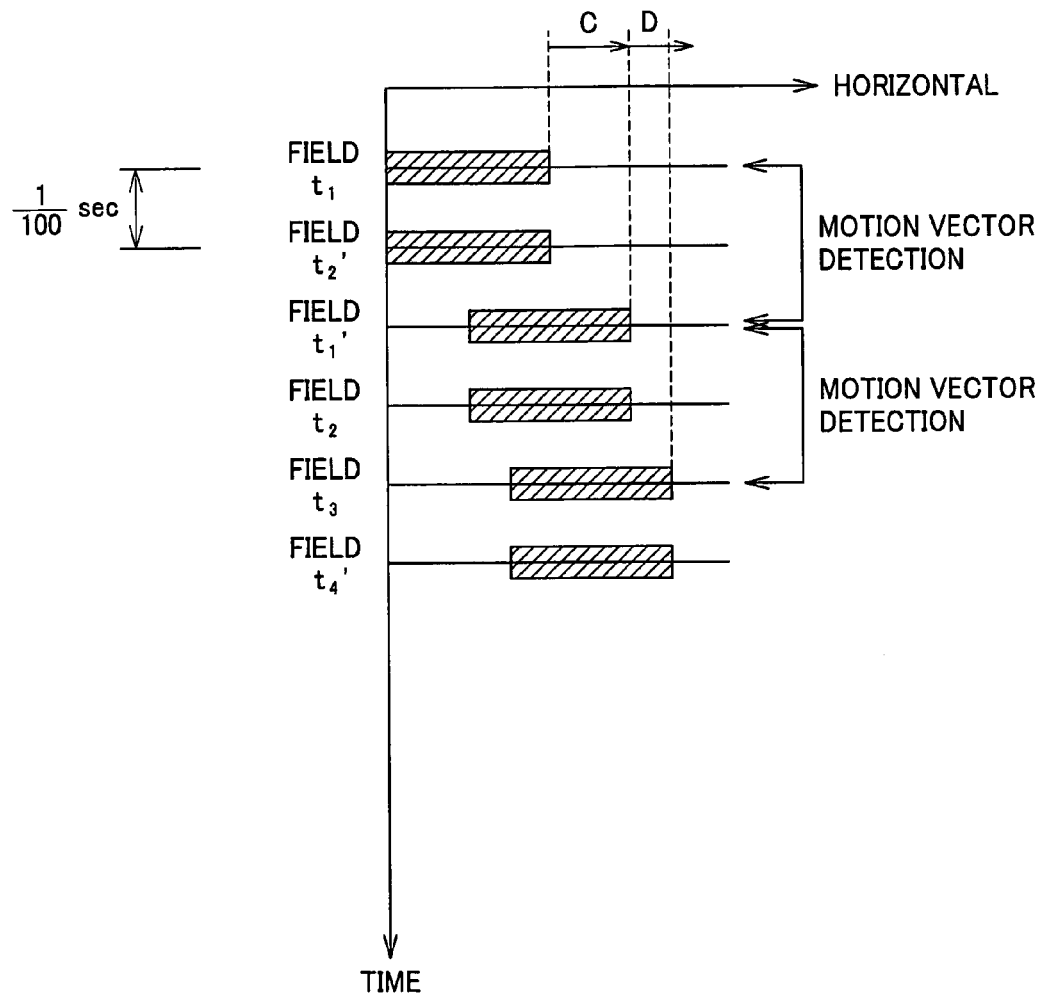
FIG. 9 shows a relationship between each field and an image position in case where an image moves in the horizontal direction in an image formed of TV signals.

FIG. 9 shows a relationship between each field and the image position in case where an image moves in the horizontal direction in the image data obtained by subjecting TV signals to double-speed conversion. In fields $t_1$ and $t_2'$ which form one single unit-frame, equal images are displayed at equal positions. Likewise, in fields $t_1'$ and $t_2$ which form one single unit-frame, equal images are displayed at equal positions.

The motion vector detector 14 detects motion vectors in units of pixels or blocks, between the reference field and the two-frame-delayed field, with respect to the signals subjected to double-speed conversion after the telecine conversion shown in FIG. 8. In the case shown in FIG. 8, the vector direction of the motion vector is the horizontal direction (right direction) with reference to the two-frame-delayed field, and the vector quantity is A. Likewise, in case where the reference field is $t_5$, the two-frame-delayed field is $t_3$, the vector quantity of the motion vector is B. By repeating this procedure, it is possible to obtain sequentially the vector directions and the vector quantities of the motion vectors with reference to the two-frame-delayed fields. The motion vector detector 14 sequentially transmits the obtained vector quantities and vector directions of the motion vectors, to the image shifter 16.

The motion vector detector detects motion vectors in units of pixels or blocks, between the reference field and the one-frame-delayed field, with respect to the signals obtained by subjecting TV signals shown in FIG. 9 to double-speed conversion. In case of the example shown in FIG. 9, the vector direction of the motion vector is the horizontal direction (right direction) with reference to the one-frame-delayed field, and the vector quantity is C when the reference field is $t_1'$. Likewise, in case where the reference field is $t_4'$, the one-frame-delayed field is $t_1'$, and the vector quantity of the motion vector is D. By repeating this procedure, it is possible to obtain sequentially the vector directions and the vector quantities of the motion vectors with reference to one-frame-delayed fields. The motion vector detector 74 sequentially transmits the obtained vector quantities and vector directions of the motion vectors, to the image shifter 16.

The sequence detector 13 sequentially detects the field (hereinafter referred to as a one-frame-delayed field) which is outputted from the first image memory 11 and is one frame ahead the reference field, and operates difference values between pixel signal levels at equal pixel positions.

Figure 10:
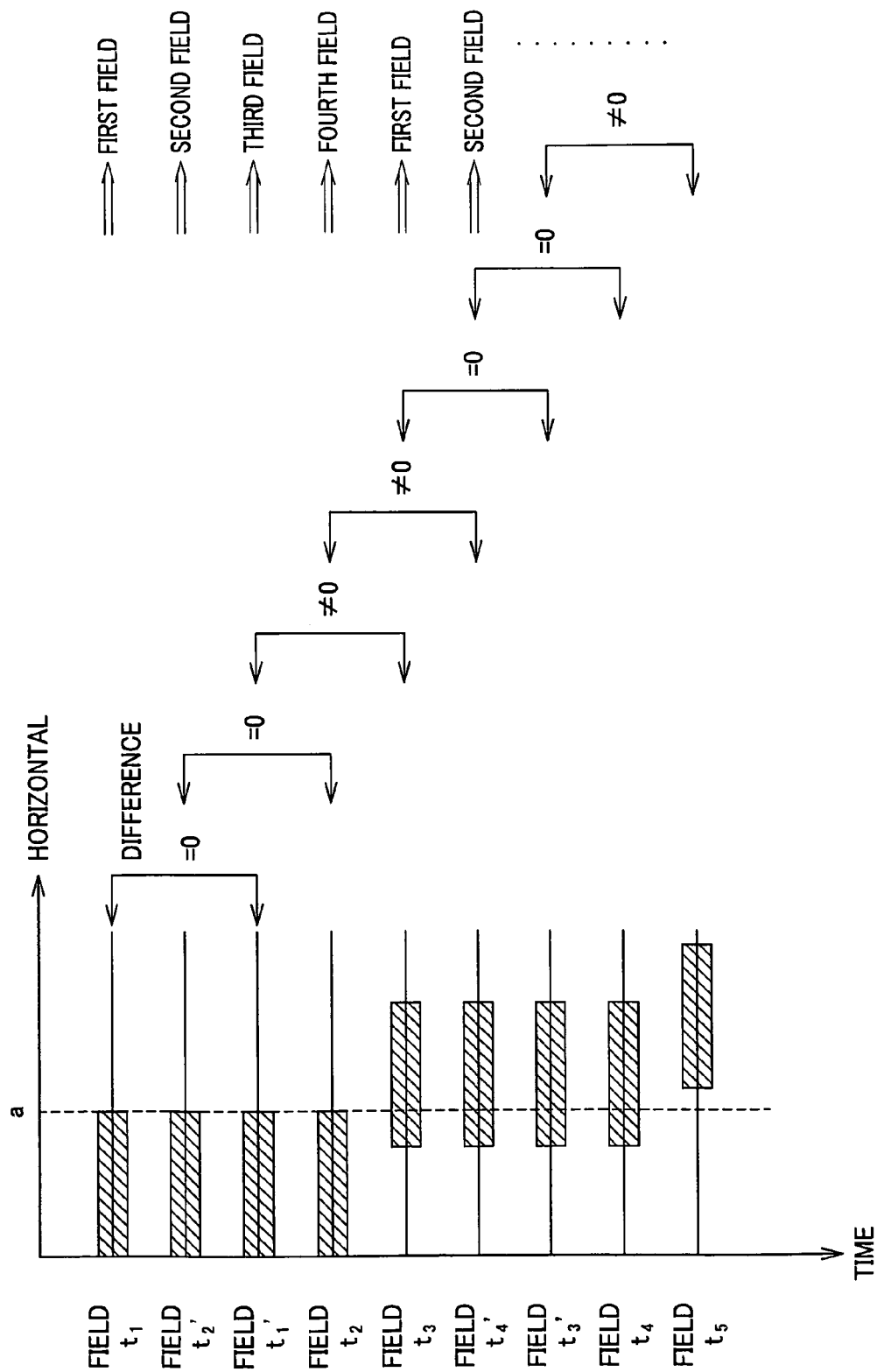
FIG. 10 is a view for explaining a method of detecting a sequence.

That is, as shown in FIG. 10, in case of telecine-converted images, the reference field $t_1'$ and the one-frame-delayed field $t_1$ form one single unit-frame, and therefore, the difference value between pixel signal levels at the point a of a pixel position is 0. When the field $t_2$ is next supplied as the reference field, the one-frame-delayed field is the field $t_2'$, and the difference value between pixel signal levels at the point a is 0, too.

When the field $t_3$ is next supplied as the reference field, the one-frame-delayed field is $t_1'$, and both of these fields respectively form parts of different unit-frames. Therefore, the difference value between pixel signal levels at the point a is not 0 (hereinafter supposed to be 1). When the field $t_4'$ is next supplied as the reference field, the one-frame-delayed field is the field $t_2$, and the difference value between pixel signal levels at the point a is 1, too.

Further, when $t_3'$ is supplied as the reference field, the one-frame-delayed field is $t_3$, and both of these fields form one single unit-frame. Therefore, the difference value between pixel signal levels at the point a is 0 again. The same tendency appears in the reference fields supplied later, so that the operated difference values repeat in the order of "0011" in cycles of four fields. Accordingly, it is possible to specify the relationship of each field with preceding and following fields, by detecting this sequence in units of four fields.

Where this tendency is observed with respect to the one-frame-delayed fields, the difference values are "0011" in the order from the first field of every unit-frame. Therefore, when the difference value "0" is calculated at first, the one-frame-delayed field detected is specified as the first field of a unit-frame (hereinafter referred to as the first field). When the difference value "0" continues, the one-frame-delayed field detected is specified as the second field. When "1" is calculated at first to be the difference value, the one-frame-delayed field detected is specified as the third field. When the difference value "1" continues, the one-frame-delayed field detected is specified as the fourth field.

Even in case where TV signals are inputted, it is necessary to determine whether each field corresponds to the first field or second field. However, since the corresponding field is determined when double-speed conversion is performed by the double-speed field conversion circuit 3, it is unnecessary to perform sequence detection as described above. That is, when TV signals are inputted from the double-speed field conversion circuit 3, the first field and the second field have been specified.

Figure 11A:
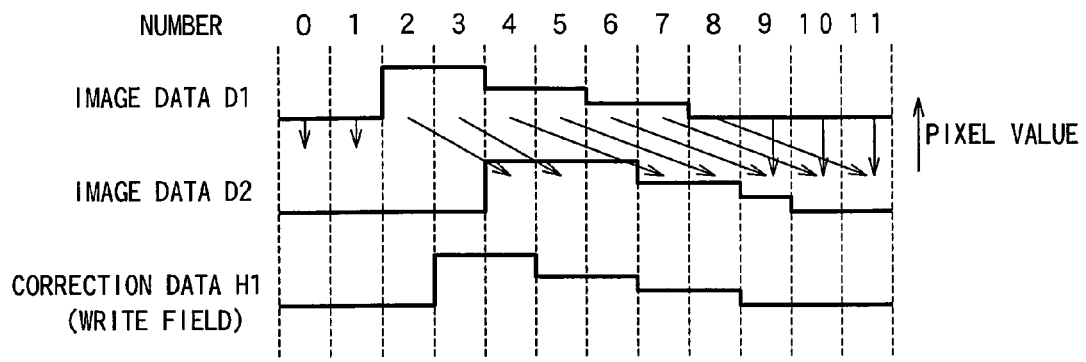
FIGS. 11A and 11B depict one-dimensionally an operation process of the image shifter.

FIG. 11A shows, as a one-dimensional graph, a specific operation example of the image shifter 16 in case where TV signals in which every unit-frame is formed of two fields are inputted. The operation example in FIG. 11 shows a case in which TV signals are inputted, the image data D1 is the first field, and the image data D2 is the first field which is one-frame behind the image data D1. In FIG. 11A, the numbers starting from 0 are the addresses indicative of pixel positions, and the ordinate axis represents the pixel value (=pixel signal level).

Figure 11B:
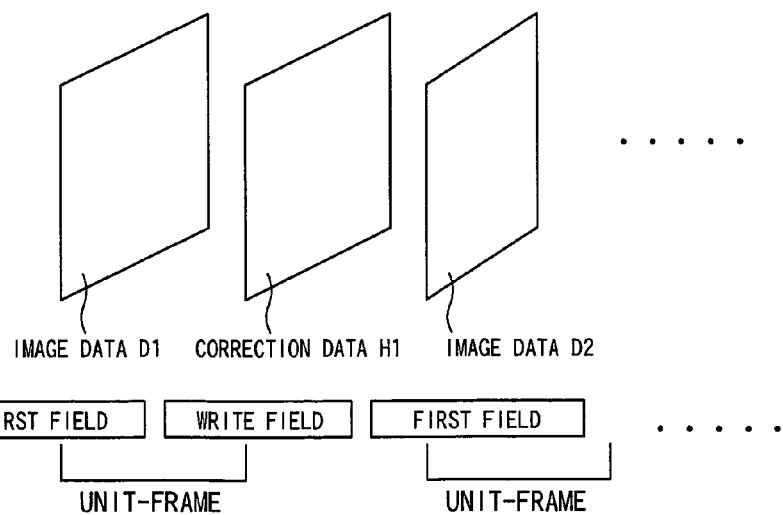

In the present invention, as shown in FIG. 11B, correction data is written into the second field (hereinafter referred to as a write field) positioned in the middle between the image data D1 and D2 which are different in time from each other, such that the motion looks smooth in a variety of images. Specifically, in the example shown in FIG. 11A, when from the image data D1 in which a convex portion exists in the left side transits to the image data D2 in which a convex portion exists in the center, an image which makes the whole motion look smooth is created in the write field described above.

FIGS. 12A to 12D show a specific operation example of the image shifter 16 shown in FIG. A, by using pixel values. FIG. 12A shows the image data D1 and D2 inputted to the image shifter 16, and the numbers are addresses indicative of pixel positions. Since each every pixel has luminance, a pixel value is assigned to every number with respect to the supplied image data D1.

That is, in the operation example shown in FIG. 12A, the image data D1 is expressed by pixel values which are successive, e.g., 100, 100, 200, . . . respectively at the addresses numbered 0 to 11.

The image data D2 positioning behind the image data D1 is expressed by pixel values which are successive, e.g., 100, 100, 100, . . . respectively at the addresses numbered 0 to 11.

The motion vectors shown in FIG. 12A express vector quantities with reference to pieces of image data D1 for respective pixels, between the image data D1 and D2. For example, the pixel having a pixel value of 100 at the address numbered 1 of the image data D1 is also at the address numbered 1 of the image data D2 which is positioned one field behind. Therefore, the motion vector is 0. For example, the pixel having a pixel value of 200 at the address numbered 2 of the image data D1 moves to the address numbered 4. Therefore, the motion vector is 2 which is obtained by 4−2=2. The arrow shown in FIG. 11A indicates a motion vector for every pixel.

The flags F1 shown in FIG. 12A are examples where absolute values of differences between the detected pixels of the image data D1 and the corresponding detected pixels of the image data D2. In the example shown in FIG. 12A, the pixel having a pixel value of 200 at the address numbered 2 of the image data D1 moves to the address numbered 4 of the image data D2, and thus, the pixel value of 200 does not change. Therefore, the absolute value of the difference is 0. On the other side, the pixel having a pixel value of 110 at the address numbered 7 of the image data D1 moves to the address numbered 10 of the image data D2, and the pixel value changes to 100. Therefore, the absolute value of the difference is 10.

FIG. 12B shows about the shift buffer read control signal RS1. The example in FIG. 12B shows a case where the value shifted by positive one from the value of the address calculation counter is CX1 based on the foregoing expression (1.1), e.g., 0, 1, 2, 3 . . . and the motion quantity information α is set to ½. The numerical value CX1 of the address calculation counter is outputted in correspondence with the number indicative of the address of the image data D1.

For example, if the numerical value of the address calculation counter is 2 when a shift buffer read control signal RS1 is generated, the motion vector of the pixel position corresponding to the number 2 is 2, based on FIG. 12A. Therefore, the number of the shift buffer read control signal RS1 is 3 from 2+2×½=3 based on the foregoing expression (1.1). Similarly, if the number of the address calculation counter is 3, the motion vector corresponding to the number 3 is 2, based on FIG. 12A. This is substituted in the foregoing expression (1.1), and the number of the shift buffer read control signal RS1 is 4 from 3+2×½=4.

That is, the number of the generated shift buffer read control signal RS1 indicates the number of the address in the write field at which the correction data H1 is to be written.

With respect to the calculated address of the shift buffer read control signal RS1, the flag F' is read out to detect the state of writing the motion vector into the shift buffer 163. If no motion vector has been written at the address accessed by the shift buffer 163, "NM" is returned as the flag F'. On the other side, absolute values of differences are returned with respect to the addresses at which motion vectors have already been written.

For example, in the example in FIG. 12B, the shift buffer 163 indicates that no data has been written, in form of the flag F', at the addresses numbered 0 to 8 of the shift buffer read control signal RS1. At the address numbered 9, "NM" indicating that no data has been written is returned first, as the flag F', and an absolute value of a difference is returned next, as the flag F'. This means that plural motion vectors are written at the address numbered 9 of the shift buffer 163. This can be found from the FIG. 11A in which motion vectors based on the numbers 6 and 9 of the image data D1 are concentrated at the address numbered 9 of the image data D2.

At the addresses of the shift buffer 163 at which the flag F' is returned as "NM", motion vectors are sequentially written in correspondence with the numbers of the addresses. If the flag F' has a numerical value, the flag F' and the flag F corresponding to the address number are compared with each other, and the one that has a smaller numerical value is rendered valid. As a result of this, motion vectors which have less errors can be written into the shift buffer 163 while the image data D1 transits to the image data D2. Hence, motions can be corrected with high accuracy with respect to such a variety of images that involve plural motion vectors at one single pixel position.

The shift buffer write controller 162 determines the address at which a motion vector should be written into the shift buffer 163, based on the supplied flag F'. For example, at the number 9, the flag F is 10 and the flag F' is 0. Since priority is given to the flag having a smaller numerical value, the motion vector "3" based on the address numbered 6 and written at first is kept stored directly in the shift buffer 163 at the number 9.

The shift buffer write controller 162 associates the number corresponding to the address with a motion vector to prepare a shift buffer write control signal RS2, and writes the signal RS2 into the shift buffer 163. The shift buffer 163 after the writing stores motion vectors at addresses of respective numbers, as shown in the lower part of FIG. 12B.

FIG. 12C shows a result of rearranging the motion vectors stored in the shift buffer 163, in the order of address numbers. Also, the processing flag F2 shows mark information at each address. If "OK" is outputted as the processing flag F2, it indicates that data has been written at the address of the corresponding number. Alternatively, if "NM" is outputted as the processing flag F2, it indicates that no data has been written at the address of the corresponding number. For example, at the address numbered 2, no data has been written, and therefore, "NM" is outputted as the processing flag F2.

Moved motion vectors read from the shift buffer 163 are supplied to the data buffer read controller 164, and the processing flags F2 are supplied to the data operator 167.

The data buffer read controller 164 creates buffer control signals S11 and S12, with use of the foregoing expressions (2.1) to (2.4), based on the supplied moved motion vectors. For example, if the value of the address calculation counter is set to the number corresponding to an address of the shift buffer 163, the moved motion vector is 2 at the address numbered 3, from FIG. 12C. Therefore, the buffer control signal S11 is 2 according to the foregoing expression (2.1), and the buffer control signal S12 is 4 according to the foregoing expression (2.3). At the address numbered 6, the moved motion vector is also 3. Therefore, the buffer control signal S11 is 5, and the buffer control signal S12 is 8.

The buffer control signal S11 calculated as described above is supplied to the first buffer 165, and the pixel value at the address corresponding to the number of the buffer control signal S11 is read from the first buffer 165. The pixel value thus read is supplied to the data operator 167 or the like, linked as shift data SD1 to the address, as shown in the middle part of FIG. 12C.

Similarly, the buffer control signals S12 is supplied to the second buffer 166, and the pixel value corresponding to the number of the buffer control signal S12 is read from the second buffer 166. The read pixel value is linked as shift data SD2 to the address, as shown in the middle part of FIG. 12C, and supplied to the data operator 167 and the like.

The lowest part of FIG. 12C shows a case where the correction data H1 is set to the average value between the shift data SD1 and SD2. The data operator 167 calculates the correction data H1, based on the corresponding shift data SD1 and SD2, with respect to those numbers at which "OK" is outputted as the processing flag F2 to be transmitted. At the address numbered 2 at which "NM" is outputted, the pixel value of the address at the adjacent number 1 is held directly.

The image shown in FIG. 11A can be created by writing the generated correction data H1 into the write field for every one of addresses of numbers.

In the image signal processing apparatus 1 to which the present invention is applied, optimal correction data capable of smoothing motions of images between pieces of image data which differ in time from each other is written into a write field. Therefore, discontinuity in motions of images can be eliminated efficiently even in a variety of images in which pixel values change as an image moves in, for example, the horizontal direction.

In case where both of the telecine-converted image signals and the TV signals are inputted, the image signal processing apparatus 1 can eliminate efficiently discontinuity in motions, in response to a variety of images. As a result of this, this apparatus can be built in a television receiver inputted with both the film signals and the TV signals. In addition, if the apparatus is newly built in a television receiver which has already been sold, the version of the television receiver can be upgraded easily, so that the versatility can be improved more.

Further, the image signal processing apparatus to which the present invention is applied needs only to store flags and motion vectors into the shift buffer 163. Therefore, the volume of the buffer can be reduced greatly, so that discontinuity in motions can be eliminated by a more efficient structure.

Note that the present invention is by no means limited to the embodiment described above. For example, the present invention is applicable to a system in which the shift buffer read controller 161 is removed from the image shifter 16 shown in FIG. 6, the shift buffer read control signal RS1, flag F1, and flag F' are omitted, and the priority order is determined. If pieces of data to be written at addresses overlap each other in this image shifter 16, a piece of data which is temporally calculated later is overwritten on the other piece of data which has already been written. However, control is unnecessary when reading the flag, the circuit can be simplified much more.

The present invention is not limited to application to a television receiver according to PAL system but is applicable also to a television receiver inputted with interlace image signals of 60 fields/second (30 unit-frames/second) according to NTSC (National TV system Committee) system. The present invention is also applicable to a television receiver according to SECAM system.

The present invention can be built not only in a television receiver but also in a signal converter connected to a television receiver.

The present invention can be utilized in case where image signals transferred via the Internet are displayed on a PC and also in case where media or image formats are converted.

Although it has been described that the present invention is realized in form of hardware, such as a circuit, the present invention can be realized, of course, as software on a processor.

The present invention is not limited to the foregoing embodiment which has been described with reference to the drawings. Various modifications, substitutions, or equivalents will readily occur to persons in the art without deviating from the appended claims and the scope of subject matters thereof.

INDUSTRIAL APPLICABILITY

In the image signal processing apparatus and the method thereof according to the present invention, a first field is specified based on difference values between pixel signal levels calculated with respect to respective detected pixels, write pixel positions which are shifted from the positions of the detected pixels in the vector directions of motion vectors are calculated in a field following the first field, the calculated write pixel positions are stored in correspondence with the motion vectors, interpolation pixel data is calculated from pixel data read from the first field in correspondence with the stored write pixel positions and motion vectors, and the calculated interpolation pixel data is written into the write pixel positions. Therefore, it is possible to eliminate discontinuity in motions with a structure which can efficiently use buffers while suppressing screen flicker disturbance even in a variety of images.

The invention claimed is:

1. An image signal processing apparatus comprising:
a sequence detector which calculates a difference value in signal level between a detected pixel in a current field and a detected pixel at the same position in a field which is one frame behind the current field, with respect to a double-speed converted image signal in which every unit-frame starts with a first field, and specifies the first field, based on the difference value;
a motion vector detector which detects a motion vector for a field which is one frame or two frames behind the current frame, with respect to the detected pixel in the current field;
a pixel position operator which calculates a write pixel position to which a position of the detected pixel in the current field is shifted by a shift amount in a vector direction of the motion vector, in a write field subsequent to the first field, with the shift amount gradually increased within a range of a vector quantity of the motion vector as the write field follows the first field;
a storage which stores the write pixel position calculated for every write field, so as to correspond to the motion vector;
a pixel data operator which reads pixel data from each of first fields before and after the write field, in correspondence with the write pixel position and the motion vector stored in the storage in correspondence with the write pixel position, and calculates interpolation pixel data, based on the read pixel data; and
an image controller which writes the interpolation pixel data calculated by the pixel data operator into the write pixel position, in the write field.

2. The image signal processing apparatus according to claim 1, wherein the pixel data operator reads pixel data at a pixel position which is shifted from write pixel position in a direction opposite to the motion vector, in the first field positioning before the write field, and reads pixel data at a pixel position which is shifted from the write pixel position in the direction of the motion vector, in the first field positioning after the write field.

3. The image signal processing apparatus according to claim 2, wherein if image signals generated by performing double-speed conversion on television signals and having unit-frames each formed of 2 fields are inputted, an amount by which the write pixel position is shifted is set to an amount obtained by dividing the vector quantity of the motion vector by 2.

4. The image signal processing apparatus according to claim 1, wherein the data operator sets the interpolation pixel data to an average value of pixel data read from the first field.

5. The image signal processing apparatus according to claim 1, further comprising a flag operator which calculates a flag including error information of the detected motion vector, wherein
the image controller determines a priority order when writing the interpolation pixel data, based on the calculated flag.

6. The image signal processing apparatus according to claim 5, wherein the flag operator calculates, as the flag, an absolute value of a difference between the pixel data of the detected pixel in the current field and pixel data at a pixel position which is shifted by the vector quantity in the vector direction of the motion vector from the pixel position of the corresponding detected pixel in a field which is one frame or two frames behind the current field.

7. The image signal processing apparatus according to claim 1, wherein the image controller determines interpolation pixel data at a write pixel position at which no interpolation pixel data has been written, based on interpolation pixel data at another write pixel position in the periphery of the write pixel position at which no interpolation pixel data has been written.

8. The image signal processing apparatus according to claim 1, wherein the pixel position detector increases the shift amount by which the write-pixel position is shifted, by an amount obtained by dividing the vector quantity of the detected motion vector, by the number of fields forming the unit-frame, as the write field follows the first field.

9. The image signal processing apparatus according to claim 1, wherein the storage erases the stored write pixel position and motion vector for every write field.

10. An image signal processing method comprising steps of:
    inputting a double-speed converted image signal in which every unit-frame starts with a first field;
    calculating a difference value in signal level between a detected pixel in a current field and a detected pixel at the same position in a field which is one frame behind the current field, with respect to the inputted image signal, and specifying the first field, based on the difference value;
    detecting a motion vector for a field which is one frame or two frames behind the current field, with respect to the detected pixel in the current field;
    calculating a write pixel position to which a position of the detected pixel in the current field is shifted by a shift amount in a vector direction of the motion vector, in a write field subsequent to the first field, with the shift amount gradually increased within a range of a vector quantity of the motion vector as the write field follows the first field;
    storing the write pixel position calculated for every write field, so as to correspond to the motion vector;
    reading pixel data from each of first fields before and after the write field, in correspondence with the write pixel position and the motion vector stored in the storing step in correspondence with the write pixel position, and calculating interpolation pixel data, based on the read pixel data; and
    writing the interpolation pixel data calculated in the step of reading pixel data and calculating interpolation pixel data into the write pixel position, in the write field.

11. The image signal processing method according to claim 10, wherein in the first field positioning before the write field, pixel data at a pixel position which is shifted from write pixel position in a direction opposite to the motion vector is read, and in the first field positioning after the write field, pixel data at a pixel position which is shifted from the write pixel position in the direction of the motion vector is read, and interpolation pixel data is calculated based on the read pixel data.

12. The image signal processing method according to claim 11, wherein if image signals generated by performing double-speed conversion on television signals and having unit-frames each formed of 2 fields are inputted, an amount by which the write pixel position is shifted is set to an amount obtained by dividing the vector quantity of the motion vector by 2.

13. The image signal processing method according to claim 10, wherein the interpolation pixel data is set to an average value of pixel data read from the first field.

14. The image signal processing method according to claim 10, further comprising a step of calculating a flag including error information of the detected motion vector, wherein a priority order when writing the interpolation pixel data is determined, based on the calculated flag.

15. The image signal processing method according to claim 14, wherein an absolute value of a difference between the pixel data of the detected pixel in the current field and pixel data at a pixel position which is shifted by the vector quantity in the vector direction of the motion vector from the pixel position of the corresponding detected pixel in a field which is one frame or two frames behind the current field is calculated as the flag.

16. The image signal processing method according to claim 10, wherein interpolation pixel data at a write pixel position at which no interpolation pixel data has been written is determined, based on interpolation pixel data at another write pixel position in the periphery of the write pixel position at which no interpolation pixel data has been written.

17. The image signal processing method according to claim 10, wherein the shift amount by which the write pixel position is shifted is increased by an amount obtained by dividing the vector quantity of the detected motion vector, by the number of fields forming the unit-frame, as the write field follows the first field.

18. The image signal processing method according to claim 10, wherein the stored write pixel position and motion vector are erased for every write field.

* * * * *